United States Patent
Yanagisawa et al.

(10) Patent No.: US 10,971,302 B2
(45) Date of Patent: Apr. 6, 2021

(54) MULTILAYER CERAMIC CAPACITOR AND MANUFACTURING METHOD OF THE SAME

(71) Applicant: TAIYO YUDEN CO., LTD., Tokyo (JP)

(72) Inventors: Atsuhiro Yanagisawa, Takasaki (JP); Yoshinori Shibata, Takasaki (JP); Mikio Tahara, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 20 days.

(21) Appl. No.: 16/438,272

(22) Filed: Jun. 11, 2019

(65) Prior Publication Data

US 2019/0385794 A1 Dec. 19, 2019

(30) Foreign Application Priority Data

Jun. 19, 2018 (JP) .............................. JP2018-115777
Apr. 2, 2019 (JP) .............................. JP2019-070864

(51) Int. Cl.

| H01G 4/232 | (2006.01) |
|---|---|
| H01G 4/12 | (2006.01) |
| H01G 4/008 | (2006.01) |
| H01G 4/30 | (2006.01) |

(52) U.S. Cl.
CPC ......... *H01G 4/1227* (2013.01); *H01G 4/0085* (2013.01); *H01G 4/1245* (2013.01); *H01G 4/2325* (2013.01); *H01G 4/30* (2013.01)

(58) Field of Classification Search
None
See application file for complete search history.

(56) References Cited

U.S. PATENT DOCUMENTS

| 7,224,570 B2 * | 5/2007 | Yamaguchi .......... H01G 4/0085 29/25.42 |
|---|---|---|
| 2014/0268484 A1 * | 9/2014 | Kang ...................... H01G 4/30 361/301.4 |
| 2015/0279568 A1 | 10/2015 | Saito et al. |
| 2016/0293332 A1 * | 10/2016 | Kato ...................... H01G 4/232 |
| 2017/0047163 A1 * | 2/2017 | Tomizawa .............. H01G 4/12 |

(Continued)

FOREIGN PATENT DOCUMENTS

| JP | H0180011 A | 3/1989 |
|---|---|---|
| JP | 2015188046 A | 10/2015 |

*Primary Examiner* — Dion Ferguson
(74) *Attorney, Agent, or Firm* — Law Office of Katsuhiro Arai

(57) ABSTRACT

A multilayer ceramic capacitor includes: a multilayer chip in which each of dielectric layers and each of internal electrode layers are alternately stacked and the internal electrode layers are alternately exposed to two end faces; and external electrodes formed on the two end faces; wherein: a relationship "M≥−0.00002×EM+0.0012" is satisfied, when a length of end margins in a direction in which the two end faces face with each other is EM [μm] and a ratio of Mo [atm %] to a B site element [atm %] of a main component ceramic in the end margins is M, wherein the end margin is a region, in which internal electrode layers connected to one of the external electrodes without sandwiching internal electrode layers connected to the other of the external electrode, face with each other, in the multilayer chip.

9 Claims, 6 Drawing Sheets

(56) References Cited

U.S. PATENT DOCUMENTS

| | | | | |
|---|---|---|---|---|
| 2018/0068797 A1* | 3/2018 | Chigira | .................... | H01G 4/30 |
| 2018/0151295 A1* | 5/2018 | Iwai | ......................... | H01G 4/30 |
| 2018/0174752 A1* | 6/2018 | Yanagisawa | ............. | H01G 4/30 |
| 2018/0197682 A1* | 7/2018 | Yamada | .................... | H01G 4/30 |
| 2019/0355518 A1* | 11/2019 | Harada | .................... | H01G 4/30 |
| 2019/0371526 A1* | 12/2019 | Ubukata | ................ | H01G 4/232 |
| 2019/0378655 A1* | 12/2019 | Iwai | ....................... | H01G 4/012 |
| 2020/0043659 A1* | 2/2020 | Kim | .................... | H01G 4/2325 |

\* cited by examiner

US 10,971,302 B2

MULTILAYER CERAMIC CAPACITOR AND MANUFACTURING METHOD OF THE SAME

CROSS-REFERENCE TO RELATED APPLICATION

This application is based upon and claims the benefit of priority of the prior Japanese Patent Application No. 2018-115777, filed on Jun. 19, 2018 and the prior Japanese Patent Application No. 2019-070864, filed on Apr. 2, 2019, the entire contents of which are incorporated herein by reference.

FIELD

A certain aspect of the present invention relates to a multilayer ceramic capacitor and a manufacturing method of the multilayer ceramic capacitor.

BACKGROUND

A multilayer ceramic capacitor has a multilayer structure in which a plurality of dielectric layers and a plurality of internal electrode layers are alternately stacked, and a pair of external electrodes that are formed on a surface of the multilayer structure and are electrically coupled to the internal electrode layers extracted to the surface. The external electrode has a structure in which a ground layer is subjected to a plating. It is known that hydrogen generated in the plating diffuses into a main body and causes IR (insulation resistance) degradation after being adsorbed near the external electrodes.

Japanese Patent Application Publication No. H01-80011 discloses that hydrogen generated in the plating is adsorbed in the internal electrode layer and an insulating resistance of the dielectric layer is degraded by reduction caused by the hydrogen. And the patent document discloses that Ni (nickel) is added as a metal for suppressing hydrogen adsorption to the internal electrode of which a main component is a noble metal. On the other hand, Japanese Patent Application Publication No. 2015-188046 discloses that the external electrode on the anode side has a large thickness in order to secure reliability of humidity resistance.

SUMMARY OF THE INVENTION

However, it is difficult to sufficiently suppress the IR degradation.

The present invention has a purpose of providing a multilayer ceramic capacitor and a manufacturing method of the multilayer ceramic capacitor that are capable of suppressing IR degradation.

According to an aspect of the present invention, there is provided a multilayer ceramic capacitor including: a multilayer chip having a parallelepiped shape in which each of a plurality of dielectric layers and each of a plurality of internal electrode layers are alternately stacked and each of the plurality of internal electrode layers is alternately exposed to two end faces of the multilayer chip, a main component of the plurality of dielectric layers being a ceramic; and a pair of external electrodes that are formed on the two end faces; wherein: the pair of external electrodes have a structure in which a plated layer is formed on a ground layer of which a main component is a metal or an alloy including at least one of Ni and Cu; the ground layer includes Mo; and wherein a relationship "M≥−0.00002× EM+0.0012" is satisfied, when a length of end margins in a direction in which the two end faces face with each other is EM [µm] and a ratio of Mo [atm %] to a B site element [atm %] of a main component ceramic in the end margins is M, wherein the end margin is a region, in which internal electrode layers connected to one of the external electrodes without sandwiching internal electrode layers connected to the other of the external electrode, face with each other, in the multilayer chip.

According to another aspect of the present invention, there is provided a manufacturing method of a ceramic multilayer capacitor including: forming a ceramic multilayer structure having a parallelepiped shape in which each of a plurality of ceramic dielectric green sheets and each of a plurality of conductive pastes for forming an internal electrode are alternately stacked and the each of the plurality of conductive pastes is alternately exposed to two end faces of the ceramic multilayer structure; coating metal paste on the two end faces, the metal paste contacting to the two end faces, the metal paste including metal powder and a Mo source, a main component of the metal powder being a metal or an alloy including at least one of Ni and Cu; forming a multilayer chip from the ceramic multilayer structure and ground layers from the metal paste, by firing the ceramic multilayer structure on which the metal paste is coated; and forming external electrodes, each of which includes each of the ground layers and a plated layer, by performing plating with respect to the ground layers, wherein an amount of the Mo source in the metal paste is adjusted so that a relationship "M≥−0.00002×EM+0.0012" is satisfied, when a length of end margins in a direction in which the two end faces face with each other is EM [µm] and a ratio of Mo [atm %] to a B site element [atm %] of a main component ceramic in the end margins is M, wherein the end margin is a region, in which internal electrode layers connected to one of the external electrodes without sandwiching internal electrode layers connected to the other of the external electrode, face with each other, in the multilayer chip.

DETAILED DESCRIPTION

A description will be given of an embodiment with reference to the accompanying drawings.

EMBODIMENT

Figure 1:
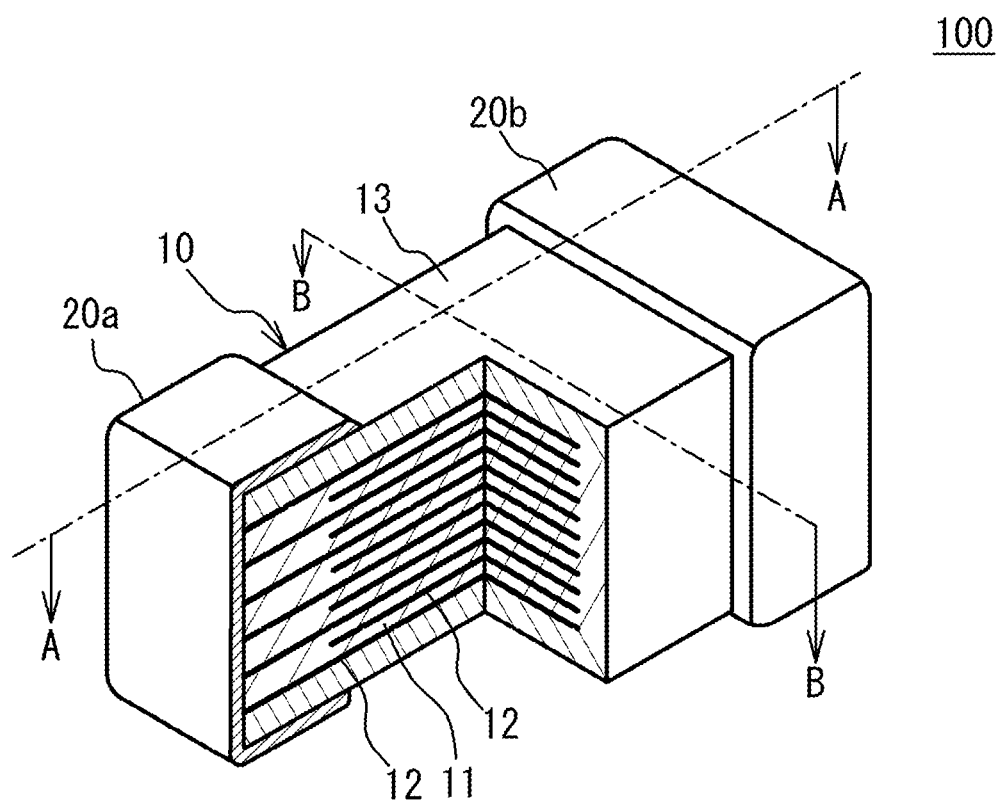
FIG. 1 illustrates a partial perspective view of a multilayer ceramic capacitor.
Figure 2:
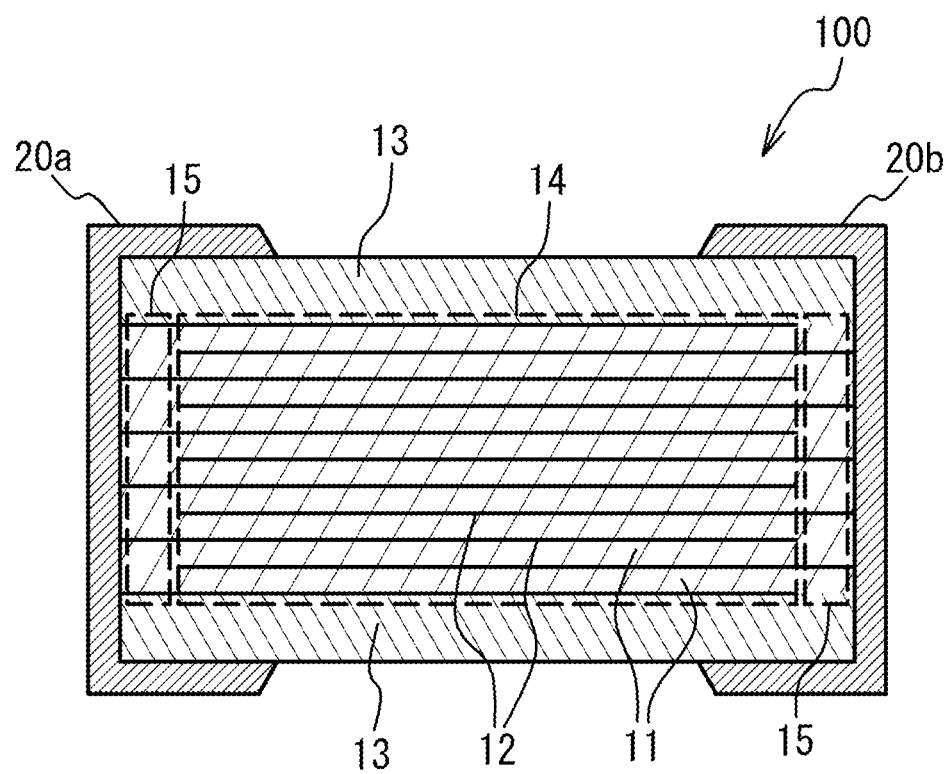
FIG. 2 illustrates a cross sectional view taken along a line A-A of FIG. 1.
Figure 3:
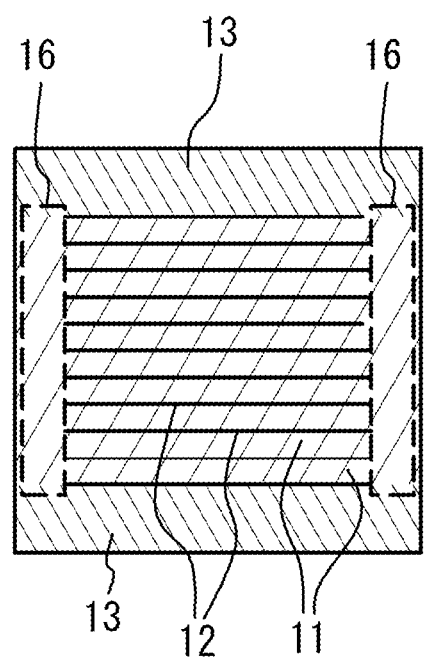
FIG. 3 illustrates a cross sectional view taken along a line B-B of FIG. 1.

FIG. 1 illustrates a partial perspective view of a multilayer ceramic capacitor 100 in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. Two faces other than an upper face and a lower face in a stacking direction among four faces other than the two end faces are referred to as side faces. The external electrodes 20a and 20b extend to the upper face, the lower face and the two side faces. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer structure of the dielectric layers 11 and the internal electrode layers 12, outermost layers are two of the internal electrode layers 12. An upper face and a lower face in the stack direction of the multilayer structure are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of noble metal such as platinum (Pt), palladium (Pd), silver (Ag), gold (Au) or alloy thereof. An average thickness of the internal electrode layers 12 is, for example, 1 μm or less. The dielectric layers 11 are mainly composed of a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. An average thickness of the dielectric layers 11 is, for example, 1 μm or less.

As illustrated in FIG. 2, a region, in which a set of the internal electrode layers 12 connected to the external electrode 20a face another set of the internal electrode layers 12 connected to the external electrode 20b, is a region generating electrical capacity in the multilayer ceramic capacitor 100. And so, the region is referred to as a capacity region 14. That is, the capacity region 14 is a region in which the internal electrode layers 12 next to each other are connected to different external electrodes face each other.

A region, in which the internal electrode layers 12 connected to the external electrode 20a face with each other without sandwiching the internal electrode layer 12 connected to the external electrode 20b, is referred to as an end margin region 15. A region, in which the internal electrode layers 12 connected to the external electrode 20b face with each other without sandwiching the internal electrode layer 12 connected to the external electrode 20a is another end margin region 15. That is, the end margin region 15 is a region in which a set of the internal electrode layers 12 connected to one external electrode face with each other without sandwiching the internal electrode layer 12 connected to the other external electrode. The end margin region 15 is a region that does not generate electrical capacity in the multilayer ceramic capacitor 100.

As illustrated in FIG. 3, a region of the multilayer chip 10 from the two sides thereof to the internal electrode layers 12 is referred to as a side margin region 16. That is, the side margin region 16 is a region covering edges of the stacked internal electrode layers 12 in the extension direction toward the two side faces. The side margin region 16 does not generate electrical capacity.

Figure 4:
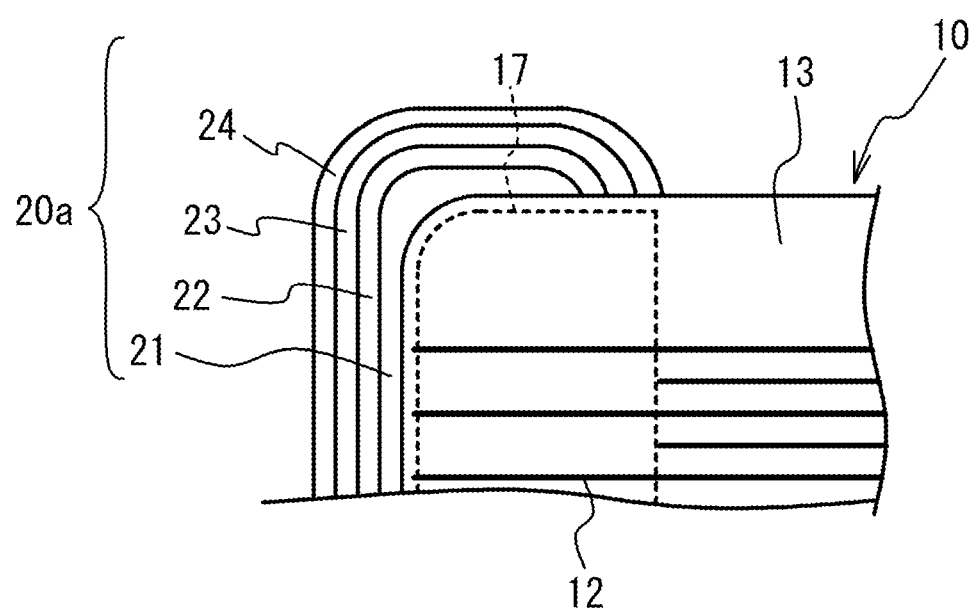
FIG. 4 illustrates a cross sectional view of an external electrode which is a partial cross sectional view taken along a line A-A of FIG. 1.

FIG. 4 illustrates a cross sectional view of the external electrode 20a and is a partial cross sectional view taken along a line A-A of FIG. 1. In FIG. 4, hatching for cross section is omitted. As illustrated in 4, the external electrode 20a has a structure in which a Cu-plated layer 22, a Ni-plated layer 23 and a Sn-plated layer 24 are formed on a ground layer 21 in this order. The ground layer 21, the Cu-plated layer 22, the Ni-plated layer 23 and the Sn-plated layer 24 extend toward the four side faces of the multilayer chip 10 from the both end faces of the multilayer chip 10. In FIG. 4, the external electrode 20a is illustrated. However, the external electrode 20b has the same structure as the external electrode 20a.

A main component of the ground layer 21 is a metal or an alloy including at least one of Ni and Cu. The ground layer 21 may include a glass component for densifying the ground layer 21 or a co-material for controlling sinterability of the ground layer 21. The glass component is an oxide such as Ba, Sr, Ca, Zn (zinc), Al (aluminum), Si (silicon), B (boron) or the like. The co-material is a ceramic component. For example, the co-material is a ceramic component that is a main component of the dielectric layer 11.

The ground layer 21 includes Mo (molybdenum). When the Cu-plated layer 22, the Ni-plated layer 23 and the Sn-plated layer 24 are formed, hydrogen is generated. However, when the ground layer 21 includes Mo, intrusion of the hydrogen into the internal electrode layer 12 is suppressed. For example, Mo has a function of preventing hydrogen permeation. It is thought that an intrusion path of the hydrogen is blocked (blocking effect is achieved), because Mo preventing the hydrogen permeation is provided in the ground layer 21, the Mo diffuses into ceramic regions 17 near the external electrodes 20a and 20b with concentration distribution, and permeability of the hydrogen in the ground layer 21 and the ceramic region 17 is reduced. Each of the ceramic regions 17 is a region of the multilayer chip 10 on each end face side, with respect to facing region in which a set of the internal electrode layers 12 connected to one of the external electrodes and another set of the internal electrode layers 12 connected to the other face with each other. The ceramic region 17 includes a part of the cover layers 13, a whole of the end margin region 15 and a part of the side margin region 16. When the intrusion path of hydrogen is blocked, adsorption of the hydrogen into the internal electrode layer 12 is suppressed and reduction of the dielectric layer 11 is suppressed. Thus, the decrease of the insulating resistance of the multilayer ceramic capacitor 100 is suppressed. In the plating process of the Cu-plated layer 22 and the Ni-plated layer 23, a lot of hydrogen is generated at a surface subjected to the plating. Therefore, it is specifically effective to block the intrusion path of hydrogen.

When a part of Mo in the ground layer 21 diffuses into the dielectric layer 11, the diffused Mo is replaced with the B site of the perovskite structure expressed by $ABO_3$ and acts as a donor. Therefore, generation of an oxygen defect in the ceramic structuring the dielectric layer 11 is suppressed. Accordingly, reduction resistance of the dielectric layer 11 is enhanced. In the embodiment, Mo included in the ground layer 21 is focused on. However, the structure is not limited. Another element that has a function preventing the hydrogen permeation, is replaced with the B site and acts as a donor may be used instead of Mo. The element is such as Nb (niobium), Ta (tantalum), W (tungsten) or the like.

When a main component of the internal electrode layer 12 is Ni, the hydrogen adsorption of the internal electrode layer 12 is enhanced. Therefore, when the main component of the internal electrode layer 12 is Ni, it is specifically effective to suppress the hydrogen intrusion from the external electrodes 20a and 20b. In the plating process of the Cu-plated layer 22 and the Ni-plated layer 23, a lot of hydrogen is generated at the surface subjected to the plating process. Therefore, it is specifically effective to block the intrusion path of hydrogen.

Sn has high compactness. This is because Sn has a closest packing structure. When the Sn-plated layer 24 is formed on the ground layer 21, hydrogen is confined on the multilayer chip 10 side with respect to the Sn-plated layer 24. That is, influence of the hydrogen tends to occur. Therefore, when the Sn-plated layer 24 is formed on the ground layer 21, it is specifically effective to suppress intrusion of hydrogen from the external electrodes 20a and 20b.

With respect to the multilayer ceramic capacitor 100, downsizing and capacity enlargement are requested. And so, the end margin region 15 and the side margin region 16 are designed so as to have a small size. As illustrated in FIG. 2, a length "EM" is defined as a length of each of the end margin regions 15 in a direction in which the end faces of the multilayer chip 10 face with each other. There is a correlation between the number of IR degradation of a reliability test and the length "EM" of the end margin region 15. The reliability test is a load test of resistance against humidity. The number of the IR degradation is the number of multilayer ceramic capacitors in which the IR degradation occurs, with respect to a predetermined number of multilayer ceramic capacitors. In concrete, when the end margin region 15 gets shorter, the number of the IR degradation increases.

Figure 5:
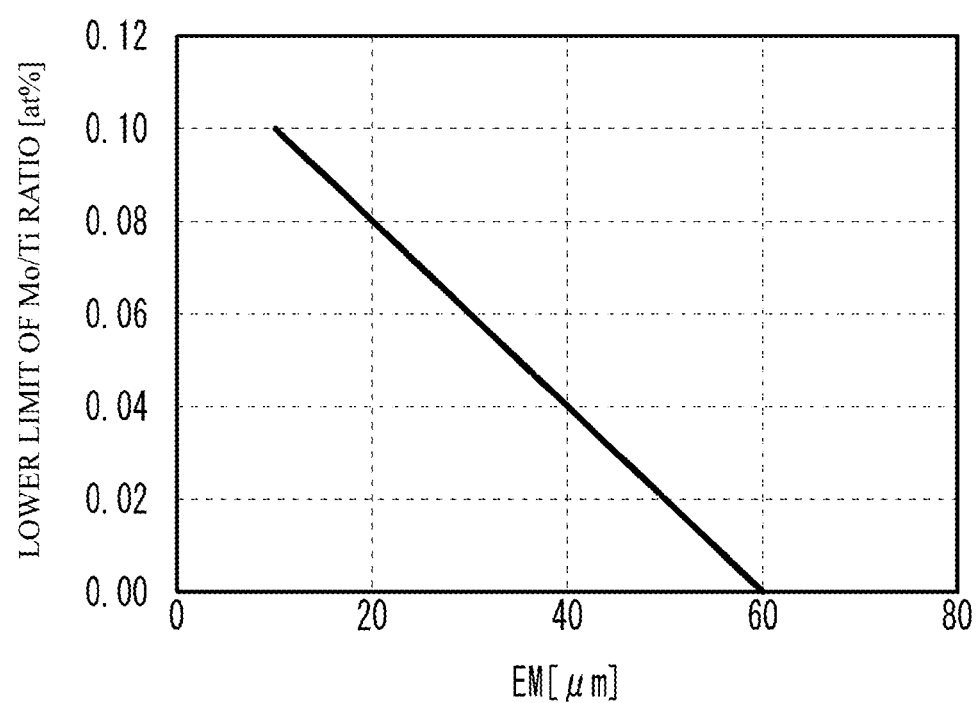
FIG. 5 illustrates a formula (1)

The present inventors have found that the IR degradation can be suppressed, when the amount of $MoO_3$ added to the metal paste for the external electrode for forming the ground layer 21 is enlarged and the amount of Mo diffused into the end margin region 15 is enlarged, in a case where the end margin region 15 gets shorter. In concrete, the present inventors have found that the IR degradation can be suppressed, when the following formula (1) is satisfied between the length EM [μm] of each end margin region 15 and the ratio M of Mo (atm %) to a B site element (atm %) of the main component ceramic in the end margin region 15 (Mo/Ti ratio (Mo concentration atm %) with respect to Ti (atm %)) in a case of $BaTiO_3$). FIG. 5 illustrates the following formula (1) as expressed in percent.

$$M \geq -0.00002 \times EM + 0.0012 \quad (1)$$

From a view point of suppression of the IR degradation, it is preferable that the amount of Mo in the end margin region 15 is large. It is therefore preferable that a relationship "$M \geq -0.00002 \times EM + 0.0014$" is satisfied. It is more preferable that a relationship "$M \geq -0.00002 \times EM + 0.0016$" is satisfied.

When the end margin region 15 is sufficiently long, it is possible to suppress the IR degradation even if the end margin region 15 does not include Mo. In concrete, when the length "EM" is more than 60 μm, the end margin region 15 may not necessarily include Mo. It is therefore preferable that the end margin region 15 includes Mo when the length "EM" is less than 60 μm.

The ratio Mo/Ti is obtained by analyzing the cross section of the end margin region 15 parallel with the side face illustrated in FIG. 2, with use of ICP-MS. For example, it is possible to measure the ratio Mo/Ti, by the ICP-MS analyzing with use of an emitted laser, with respect to the whole area of the cross section of the end margin region of FIG. 2.

Figure 6:
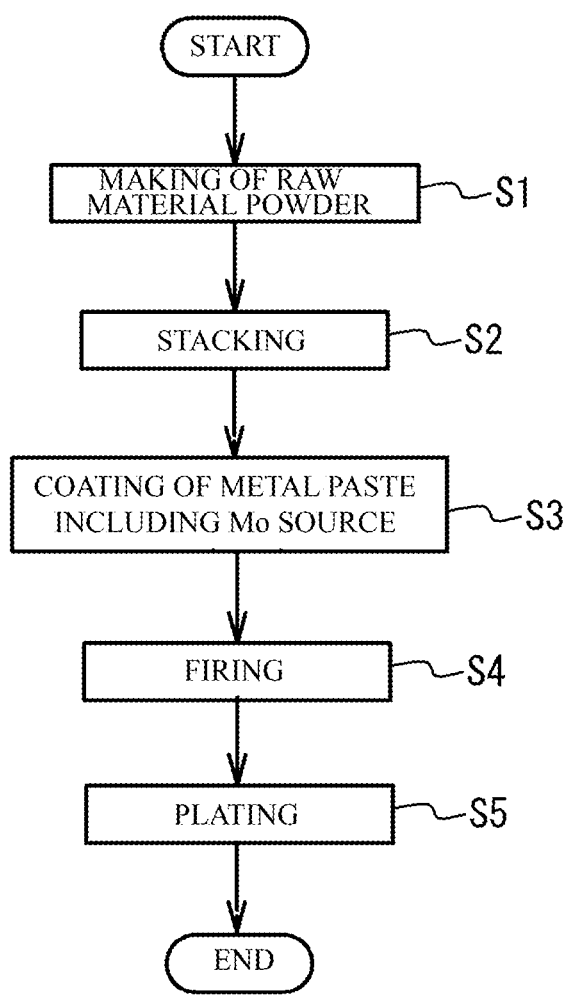
FIG. 6 illustrates a manufacturing method of a multilayer ceramic capacitor.

Next, a description will be given of a manufacturing method of the multilayer ceramic capacitor 100. FIG. 6 illustrates a manufacturing method of the multilayer ceramic capacitor 100.

[Making Process of Raw Material Powder]

Additive compound may be added to ceramic material powder that is a main component of the dielectric layer 11, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium), or an oxide of Co (cobalt), Ni, Li (lithium), B, Na (sodium), K (potassium) and Si, or glass. For example, compound including additive compound is added to ceramic material powder and is calcined. Next, the resulting ceramic material grains are wet-blended with additive compound, is dried and is crushed. Thus, the ceramic material powder is prepared.

[Stacking Process]

Next, a binder such as polyvinyl butyral (PVB) resin, an organic solvent such as ethanol or toluene, and a plasticizer are added to the resulting ceramic material powder and wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing conductive paste for forming the internal electrode with use of screen printing or gravure printing. The conductive paste includes powder of the main component metal of the internal electrode layer 12, a binder, a solvent, and additives as needed. It is preferable that the binder and the solvent are different from those of the above-mentioned ceramic slurry. As a co-material, the ceramic material that is the main component of the dielectric layer 11 may be distributed in the conductive paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of external electrodes of different polarizations. Cover sheets, which are to be the cover layers 13, are compressed on the stacked green sheets and under the stacked green sheets. The resulting compact is cut into a predetermined size (for example, 1.0 mm×0.5 mm). Thus, a ceramic multilayer structure having a rectangular parallelepiped shape is obtained.

[Coating Process of a Metal Paste]

Next, the binder is removed from the ceramic multilayer structure made in the stacking process in $N_2$ atmosphere in a temperature range of 200 degrees C. to 500 degrees C. After that, metal paste including a metal filler, the co-material, the binder, the solvent and a Mo source is coated from the both end faces of the ceramic multilayer structure to each side face and is dried. The metal paste is used for forming the external electrodes.

A type, a shape or the like of the Mo source is not limited. For example, in concrete, molybdenum oxide ($MoO_2$, $MoO_3$), molybdenum chloride ($MoCl_2$, $MoCl_3$, $MoCl_4$), molybdenum hydroxide ($Mo(OH)_3$, $Mo(OH)_5$), barium molybdate ($BaMoO_4$), ammonium molybdate (($NH_4$)$_6Mo_7O_{24}.4H_2O$), molybdenum-nickel alloy, or the like may be used as the Mo source. A co-material in which Mo is dissolved in advance may be used as the Mo source.

[Firing Process]

Next, the resulting ceramic multilayer structure on which the metal paste for forming the external electrode is fired for ten minutes to 2 hours in a reductive atmosphere in a temperature range of 1100 degrees C. to 1300 degrees C. In this manner, a sintered structure having the multilayer chip 10 having the multilayer structure in which the sintered dielectric layers 11 and the sintered internal electrode layers 12 are alternately stacked and having the cover layers 13 formed as outermost layers of the multilayer chip 10 in the stack direction and the ground layer 21 is obtained.

[Plating Process]

After that, a plating process is performed. Thereby, the Cu-plated layer 22, the Ni-plated layer 23 and the Sn-plated layer 24 are formed on the ground layer 21 in this order. With the processes, the multilayer ceramic capacitor 100 is fabricated.

With the manufacturing method in accordance with the embodiment, the ground layer 21 includes Mo. In this case, when hydrogen is generated in the formation process of the Cu-plated layer 22, the Ni-plated layer 23 and the Sn-plated layer 24, the intrusion of the hydrogen into the internal electrode layer 12 is suppressed. Thus, the adsorption of the hydrogen in the internal electrode layer 12 is suppressed, and the reduction of the dielectric layer 11 is suppressed. Therefore, reduction of the insulating resistance is suppressed. And, when a part of Mo of the ground layer 21 diffuses into the dielectric layer 11, the diffused Mo is replaced with the B site of the perovskite expressed by $ABO_3$ and acts as a donor element. Thus, the generation of the oxygen defect of the ceramic structuring the dielectric layer 11 is suppressed. Accordingly, the reduction resistance of the dielectric layer 11 is enhanced.

The same effect may be achieved, when the Mo source is not added to the metal paste before forming the external electrode and a film of the Mo source is formed with a sputtering before coating the metal paste, or after coating the metal paste, or both before and after coating the metal paste, and the Mo diffuses in the firing.

In the firing, Mo in the metal paste for forming the external electrode diffuses into the end margin region 15. And so, in the embodiment, the amount of the Mo source added to the metal paste for forming the external electrode is adjusted so that the formula (1) is satisfied, when the length of the each end margin region 15 is "EM" and the ratio of the Mo concentration (atm %) with respect to the B site element (atm %) of the main component ceramic in the end margin region 15 is "M". Thus, it is possible to suppress the IR degradation. Instead of the amount of the added Mo source, the firing condition (temperature, time or the like) may be adjusted.

EXAMPLE

The multilayer ceramic capacitors in accordance with the embodiment were made and the property was measured.

Examples 1 to 6

Additive compound was added to barium titanate powder. The resulting barium titanate powder was sufficiently wet blended and was crushed by a ball mill. Thus, the dielectric material was obtained. An organic binder and a solvent were added to the dielectric material. And dielectric green sheets were made by a doctor blade method. A thickness of the dielectric green sheet was 1.2 µm. The organic binder was polyvinyl butyral (PVB) resin or the like. The solvent was ethanol, toluene or the like. And a plasticizer and so on were added. Next, the conductive paste for forming the internal electrode layer was made by mixing powder acting as a main component metal of the internal electrode layer 12, a binder, a solvent and an additive as needed. The organic binder and the solvent were different from those of the dielectric green sheet. The conductive paste was screen-printed on the dielectric sheet. 195 of the dielectric green sheets on which the conductive paste for forming the internal electrode layer was printed were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size.

The binder was removed from the ceramic multilayer structure in $N_2$ atmosphere. After that, metal paste including a metal filler of which a main component is Ni, a co-material, a binder, solvent and a Mo source was coated from the both end faces of the ceramic multilayer structure to each side face and was dried. $MoO_3$ was used as the Mo source. After that, the metal paste was fired together with the ceramic multilayer structure for 10 minutes to two hours in a reductive atmosphere within a temperature range of 1100 degrees C. to 1300 degrees C., and a sintered structure was formed.

The length, the width and the height of the sintered structure were respectively 0.6 mm, 0.3 mm and 0.3 mm. The sintered structure was re-oxidized in $N_2$ atmosphere at 800 degrees C. After that, the Cu-plated layer 22, the Ni-plated layer 23 and the Sn-plated layer 24 were formed on the surface of the ground layer 21 by plating. And the multilayer ceramic capacitor 100 was fabricated. 1000 samples of each of the examples 1 to 6 were made.

The length EM of the end margin region 15 was 70 Therefore, the M value in percent for satisfying the formula (1) is −0.02. In the example 1, the Mo/Ti ratio in percent in the end margin region 15 was 0.005. In the example 2, the Mo/Ti ratio in percent in the end margin region 15 was 0.010. In the example 3, the Mo/Ti ratio in percent in the end margin region 15 was 0.020. In the example 4, the Mo/Ti ratio in percent in the end margin region 15 was 0.050. In the example 5, the Mo/Ti ratio in percent in the end margin region 15 was 0.100. In the example 6, the Mo/Ti ratio in percent in the end margin region 15 was 0.300. The Mo/Ti ratios were obtained by performing ICP-MS analysis with respect to the cross section of the end margin region 15 parallel with the side face illustrated in FIG. 2. ICP-MS made by Agillent Technology, Model number: 7900 was used as the analyzing device. A laser device made by esi company, Model number: NWR 213 was used as the laser device. The laser spot diameter was 3 μm. The laser emission energy was 7.5 J/cm$^2$. The laser was emitted to the whole area of the cross section of the end margin region 15 illustrated in FIG. 2. The ICP-MS analysis was performed and the Mo/Ti ratio was calculated. In the following examples and the following comparative examples, Mo/Ti ratios were measured by the same analysis method.

Examples 7 to 10 and Comparative Examples 1 and 2

Multilayer ceramic capacitors were made under the same condition as that of the examples 1 to 6. In examples 7 to 10 and comparative examples 1 and 2, the length EM of the end margin region 15 was 50 Therefore, the M value in percent for satisfying the formula (1) is 0.02. In the example 7, the Mo/Ti ratio in percent in the end margin region 15 was 0.020. In the example 8, the Mo/Ti ratio in percent in the end margin region 15 was 0.050. In the example 9, the Mo/Ti ratio in percent in the end margin region 15 was 0.100. In the example 10, the Mo/Ti ratio in percent in the end margin region 15 was 0.300. In the comparative example 1, the Mo/Ti ratio in percent in the end margin region 15 was 0.005. In the comparative example 2, the Mo/Ti ratio in percent in the end margin region 15 was 0.010.

Examples 11 to 13 and Comparative Examples 3 to 5

Multilayer ceramic capacitors were made under the same condition as that of the examples 1 to 6. In examples 11 to 13 and comparative examples 3 to 5, the length EM of the end margin region 15 was 35 Therefore, the M value in percent for satisfying the formula (1) is 0.05. In the example 11, the Mo/Ti ratio in percent in the end margin region 15 was 0.050. In the example 12, the Mo/Ti ratio in percent in the end margin region 15 was 0.100. In the example 13, the Mo/Ti ratio in percent in the end margin region 15 was 0.300. In the comparative example 3, the Mo/Ti ratio in percent in the end margin region 15 was 0.005. In the comparative example 4, the Mo/Ti ratio in percent in the end margin region 15 was 0.010. In the comparative example 5, the Mo/Ti ratio in percent in the end margin region 15 was 0.020.

Examples 14 and 15 and Comparative Examples 6 to 9

Multilayer ceramic capacitors were made under the same condition as that of the examples 1 to 6. In examples 14 and 15 and comparative examples 6 to 9, the length EM of the end margin region 15 was 10 Therefore, the M value in percent for satisfying the formula (1) is 0.10. In the example 14, the Mo/Ti ratio in percent in the end margin region 15 was 0.100. In the example 15, the Mo/Ti ratio in percent in the end margin region 15 was 0.300. In the comparative example 6, the Mo/Ti ratio in percent in the end margin region 15 was 0.005. In the comparative example 7, the Mo/Ti ratio in percent in the end margin region 15 was 0.010. In the comparative example 8, the Mo/Ti ratio in percent in the end margin region 15 was 0.020. In the comparative example 9, the Mo/Ti ratio in percent in the end margin region 15 was 0.050.

The examples 1 to 15 and the comparative examples 1 to 9 were subjected to a withstand test for 100 hours in which a temperature was 85 degrees C., a relative humidity was 85%, and an applied voltage was 10 V. In this case, an incidence rate (IR degradation rate) in which a resistance value was 100 MΩ or less for 60 seconds was measured. Table 1 shows results. In Table 1, the M value indicates a lower limit value of the Mo concentration for satisfying the formula (1). When the formula (1) was satisfied, the evaluation based on the formula (1) was expressed by "○". When the formula (1) was not satisfied, the evaluation based on the formula (1) was expressed by "X".

TABLE 1

| | EM [μm] | M | Mo/Ti RATIO [%] | EVALUATION BASED ON FORMULA | NUMBER OF IR DEGRADATION | EVALUATION |
|---|---|---|---|---|---|---|
| EXAMPLE 1 | 70 | −0.02 | 0 005 | ○ | 0/1000 | ○ |
| EXAMPLE 2 | | | 0.010 | ○ | 0/1000 | ○ |
| EXAMPLE 3 | | | 0.020 | ○ | 0/1000 | ○ |
| EXAMPLE 4 | | | 0.050 | ○ | 0/1000 | ○ |
| EXAMPLE 5 | | | 0.100 | ○ | 0/1000 | ○ |
| EXAMPLE 6 | | | 0.300 | ○ | 0/1000 | ○ |
| COMPARATIVE EXAMPLE 1 | 50 | 0.02 | 0.005 | x | 8/1000 | x |
| COMPARATIVE EXAMPLE 2 | | | 0.010 | x | 1/1000 | x |
| EXAMPLE 7 | | | 0.020 | ○ | 0/1000 | ○ |
| EXAMPLE 8 | | | 0.050 | ○ | 0/1000 | ○ |
| EXAMPLE 9 | | | 0.100 | ○ | 0/1000 | ○ |
| EXAMPLE 10 | | | 0.300 | ○ | 0/1000 | ○ |
| COMPARATIVE EXAMPLE 3 | 35 | 0.05 | 0.005 | x | 76/1000 | x |
| COMPARATIVE EXAMPLE 4 | | | 0.010 | x | 21/1000 | x |
| COMPARATIVE EXAMPLE 5 | | | 0.020 | x | 2/1000 | x |

TABLE 1-continued

|  | EM [μm] | M | Mo/Ti RATIO [%] | EVALUATION BASED ON FORMULA | NUMBER OF IR DEGRADATION | EVALUATION |
|---|---|---|---|---|---|---|
| EXAMPLE 11 |  |  | 0.050 | ○ | 0/1000 | ○ |
| EXAMPLE 12 |  |  | 0.100 | ○ | 0/1000 | ○ |
| EXAMPLE 13 |  |  | 0.300 | ○ | 0/1000 | ○ |
| COMPARATIVE EXAMPLE 6 | 10 | 0.10 | 0.005 | x | 356/1000 | x |
| COMPARATIVE EXAMPLE 7 |  |  | 0.010 | x | 134/1000 | x |
| COMPARATIVE EXAMPLE 8 |  |  | 0.020 | x | 34/1000 | x |
| COMPARATIVE EXAMPLE 9 |  |  | 0.050 | x | 7/1000 | x |
| EXAMPLE 14 |  |  | 0.100 | ○ | 0/1000 | ○ |
| EXAMPLE 15 |  |  | 0.300 | ○ | 0/1000 | ○ |

As shown in Table 1, with respect to the examples 1 to 15, IR degradation number was 0/1000. It is thought that this was because intrusion of hydrogen from the external electrodes 20a and 20b into the multilayer chip 10 was suppressed, or the diffusion of the hydrogen was suppressed even if the hydrogen intruded. On the other hand, with respect the comparative examples 1 to 9, the IR degradation number was more than 0/1000. It is thought that this was because the intrusion of the hydrogen from the external electrodes 20a and 20b into the multilayer chip 10 was not sufficiently suppressed and the intruded hydrogen diffused, because the formula (1) was not satisfied.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a multilayer chip having a parallelepiped shape in which each of a plurality of dielectric layers and each of a plurality of internal electrode layers are alternately stacked and each of the plurality of internal electrode layers is alternately exposed to two end faces of the multilayer chip, a main component of the plurality of dielectric layers being a ceramic; and
a pair of external electrodes that are formed on the two end faces;
wherein:
the pair of external electrodes have a structure in which a plated layer is formed on a ground layer of which a main component is a metal or an alloy including at least one of Ni and Cu;
the ground layer includes Mo; and
wherein a relationship "M≥−0.00002×EM+0.0012" is satisfied, when a length of end margins in a direction in which the two end faces face with each other is EM [μm] and a ratio of Mo [atm %] to a B site element [atm %] of a main component ceramic in the end margins is M,
wherein the end margin is a region, in which internal electrode layers connected to one of the external electrodes without sandwiching internal electrode layers connected to the other of the external electrode, face with each other, in the multilayer chip,
wherein a concentration of Mo of the ground layer is higher than that of the end margin.

2. The multilayer ceramic capacitor as claimed in claim 1, wherein the plated layer includes a Sn-plated layer.

3. The multilayer ceramic capacitor as claimed in claim 1, wherein a main component metal of the ground layer is Ni.

4. The multilayer ceramic capacitor as claimed in claim 1, wherein a main component of the internal electrode layer is Ni.

5. The multilayer ceramic capacitor as claimed in claim 1, wherein the length EM of the end margin region is less than 60 μm.

6. The multilayer ceramic capacitor as claimed in claim 1, wherein the Mo concentration is measured by emitting a laser light to whole of the end margin in a cross section parallel with a side face of the multilayer chip and performing an ICP-MS analysis.

7. The multilayer ceramic capacitor as claimed in claim 1, wherein the ground layer includes a glass component or a ceramic component.

8. The multilayer ceramic capacitor as claimed in claim 1, wherein Mo in the ground layer exists in a phase of Mo oxide.

9. A manufacturing method of a ceramic multilayer capacitor comprising:
forming a ceramic multilayer structure having a parallelepiped shape in which each of a plurality of ceramic dielectric green sheets and each of a plurality of conductive pastes for forming an internal electrode are alternately stacked and the each of the plurality of conductive pastes is alternately exposed to two end faces of the ceramic multilayer structure;
coating metal paste on the two end faces, the metal paste contacting to the two end faces, the metal paste including metal powder and a Mo source, a main component of the metal powder being a metal or an alloy including at least one of Ni and Cu;
forming a multilayer chip from the ceramic multilayer structure and ground layers from the metal paste, by firing the ceramic multilayer structure on which the metal paste is coated; and
forming external electrodes, each of which includes each of the ground layers and a plated layer, by performing plating with respect to the ground layers,
wherein an amount of the Mo source in the metal paste is adjusted so that a relationship "M≥−0.00002×EM+0.0012" is satisfied, when a length of end margins in a direction in which the two end faces face with each other is EM [μm] and a ratio of Mo [atm %] to a B site element [atm %] of a main component ceramic in the end margins is M,
wherein the end margin is a region, in which internal electrode layers connected to one of the external electrodes without sandwiching internal electrode layers connected to the other of the external electrode, face with each other, in the multilayer chip.

* * * * *